United States Patent [19]
Kubsik et al.

[11] Patent Number: 5,598,784
[45] Date of Patent: Feb. 4, 1997

[54] EXTRUDED ALUMINUM CONVEYOR WITH TRACK OFFSET

[75] Inventors: Robert Kubsik, West Bloomfield; Robert Goryca, Farmington Hills; James P. Johnson, Howell; Eric T. Nemeth, Pinckney, all of Mich.

[73] Assignee: Jervis B. Webb Company, Farmington Hills, Mich.

[21] Appl. No.: 346,222

[22] Filed: Nov. 22, 1994

[51] Int. Cl.⁶ .................................................. E01B 25/22
[52] U.S. Cl. ..................... 104/111; 104/107; 104/172.4; 198/836.4; 198/838
[58] Field of Search ............................. 104/94, 106, 107, 104/108, 109, 111, 172.1, 172.4; 198/836.1, 836.4, 838, 861.1; 238/151, 176, 243

[56] References Cited

U.S. PATENT DOCUMENTS

| | | | |
|---|---|---|---|
| 2,784,813 | 3/1957 | Secord | 189/76 |
| 3,559,585 | 2/1971 | Lempio | 104/172 |
| 3,830,165 | 8/1974 | Turner | 104/172.4 |
| 4,157,751 | 6/1979 | Grundken et al. | 198/735 |
| 4,420,075 | 12/1983 | Skolik et al. | 198/735 |
| 4,467,914 | 8/1984 | Trammel et al. | 198/861 |
| 4,646,905 | 3/1987 | Grundken et al. | 198/735 |
| 4,694,531 | 9/1987 | Foy | 104/111 |
| 4,733,771 | 3/1988 | Grundken et al. | 198/735 |
| 4,811,829 | 3/1989 | Nakazawa et al. | 198/326 |
| 4,838,412 | 6/1989 | Backman | 104/106 |
| 4,951,809 | 8/1990 | Boothe et al. | 198/841 |
| 5,012,746 | 5/1991 | Bormann et al. | 104/107 |
| 5,137,145 | 8/1992 | Clopton | 198/860.2 |
| 5,178,263 | 1/1993 | Kempen | 198/836.1 |
| 5,355,805 | 10/1994 | Haab et al. | 104/106 |

FOREIGN PATENT DOCUMENTS

| | | | |
|---|---|---|---|
| 1201830 | 1/1960 | France | 104/107 |
| 4015970 | 11/1991 | Germany | 104/111 |

*Primary Examiner*—S. Joseph Morano
*Attorney, Agent, or Firm*—Dickinson, Wright, Moon, Van Dusen & Freeman

[57] ABSTRACT

An improved conveyor track system is provided wherein the track segments are provided with longitudinal channels of T-shaped cross-section which are offset from the centerline of the track and which accept rectangular splice bars that are used to secure the track segments together. The system is provided with a series of yokes which are connected to the track segments by means of bolts and rectangular connectors disposed in the longitudinal channels of the track segments, and whose position on the track segments is adjustable in both a horizontal and vertical direction.

42 Claims, 12 Drawing Sheets

1

EXTRUDED ALUMINUM CONVEYOR WITH TRACK OFFSET

TECHNICAL FIELD

This invention relates generally to the art of conveyors, and in particular to improvements in conveyor track systems.

BACKGROUND

Various conveyor systems are known to the prior art. Such systems typically consist of a series of track segments which are joined together along their ends to form a pathway for one or more trolleys. In the past, it was common to weld the various track segments together when the conveyor system was installed on site. U.S. Pat. No. 3,559,585 (Lempio) is illustrative of this technology. There, a power and free type conveyor system is disclosed which consists of an upper track of C-shaped cross-section, and a lower track of U-shaped cross-section. The upper and lower tracks consist of longitudinal track segments that are welded together in an end-to-end fashion by conventional methods. The upper track supports an endless driven chain which is provided with pushers projecting through the downward facing slot in the upper track. The lower track supports load carrying trolleys which are propelled by the pushers. The upper and lower tracks are welded to inverted U-shaped yokes which add rigidity to the two tracks and help to maintain a proper spacing between them.

While conveyor systems such as that described in U.S. Pat. No. 3,559,585 (Lempio) have many desirable features, these systems rely heavily on welding to secure the yokes to the track segments and to join the ends of abutting track segments together across a joint. However, it is frequently necessary to change the configuration of conveyor systems after they have been installed at a customer facility. In auto assembly plants, for example, the configuration of conveyor systems is generally changed each year, if not more frequently, to accommodate the manufacture of newer models of automobiles. Therefore, conveyor systems that rely heavily on welding are undesirable, since reconfiguration or disassembly of such a system is difficult, costly, and time consuming, and results in the scrapping of component parts that are damaged during disassembly. There is thus a need in the art for a conveyor system that may be easily assembled or disassembled without welding, and which is constructed of component parts that may be removed from the system without damage and incorporated into other conveyor systems.

To this end, various conveyor systems have been developed which require less welding during assembly. Thus, U.S. Pat. No. 4,811,829 (Nakazawa et al.) describes a frame for a passenger conveyor which consists of a plurality of frame members. This system is designed to preserve the exact spatial relation of the component parts each time the system is disassembled and reassembled. In this system, adjoining frame members are secured to each other during assembly at the plant through the use of bolts inserted through holes provided in adjoining mounting seats (see FIG. 3). A positioning pin is then inserted into a hole in the side of one of the frame members, and the base of the pin is welded to the opposite frame member. When the frame is reassembled at the installation site, the positioning pin ensures that the original alignment of the opposing frame members is reproduced.

While the system disclosed in U.S. Pat. No. 4,811,829 (Nakazawa et al.) ensures a certain reproducibility in assembly that may be important in some applications, installation of the system still requires some welding. Furthermore, the individual component parts of this system are unique by design, and cannot be interchanged. As a result, systems of this type are expensive to manufacture and maintain.

U.S. Pat. No. 4,467,914 (Trammel et al.) discloses a conveyor system which does not require welding. Instead, the system utilizes anchor wedges and flanges to properly align and join adjacent conveyor trough segments. The abutting ends of the segments are secured together by means of opposing rectangular flanges. The flanges are provided with holes for accommodating bolt and nut assemblies that are used to secure the opposing flanges together. Each segment is further provided with a channel which runs along its length and which runs underneath the rectangular flanges. In use, the anchor wedge, which is complimentary in shape to the channel, is inserted into the channel and driven forward so that it spans the abutment, thereby holding the abutting portions in proper alignment while they are secured together.

However, while the system of U.S. Pat. No. 4,467,914 (Trammel et al.) is advantageous in some respects, systems of this type are difficult to disassemble, since the anchor wedges must be forcibly removed from each channel in the process. Furthermore, insertion or removal of the anchor wedges may cause the track to be damaged, particularly when the track is constructed from aluminum, plastic, and other lightweight materials.

More recently, splice bars have been developed to join abutting track segments without the need for welding. Thus, U.S. Pat. No. 4,733,771 (Gründken et al.), U.S. Pat. No. 4,646,905 (Gründken et al.), U.S. Pat. No. 4,420,075 (Skolik et al.), and U.S. Pat. No. 4,157,751 (Gründken et al.) disclose special dogbone-shaped splice bars which are used to join abutting track segments in conveyor systems designed for use in mines. However, since these splice bars are designed to permit a certain amount of angular mobility, they are not suitable in many applications. Furthermore, the odd shape of these splice bars increases their manufacturing expense, and requires special tooling on the track segments.

A more satisfactory splice bar is shown in U.S. Pat. No. 4,951,809 (Boothe et al.). There, a conveyor system is disclosed which uses splice bars of a standard rectangular shape. The conveyor system consists of a plurality of track segments wherein each segment is provided with longitudinal twin channels of T-shaped cross section. The channels are open, but are provided on each side with a flange that protrudes partially into the opening. Adjoining track segments are connected to each other by rectangular splice bars which are disposed in the channels and which span the abutment. The splice bars are provided with threaded apertures, and are held in place by a metal plate provided with a series of holes which is placed over the abutment. Threaded bolts are provided which may be inserted into the holes to engage the threaded apertures in the splice bar, thereby clamping the abutting members together.

A further problem with many prior art conveyor systems is that they are not readily adaptable to restrictions in conveyor configurations imposed by design constraints. For example, in U.S. Pat. No. 4,467,914 (Trammel et al.), the support members are designed to be bolted onto the flanges, thus limiting the user to particular track configurations which may not be suitable for a given installation site. For instance, the placement of equipment around the conveyor system may introduce interferences in the placement of the support members. This would require the support members to be displaced from the flanges and welded to the side of the conveyor system.

It is thus desirable in a conveyor system for the placement of the support members to be adjustable along the length of the conveyor. One such system is shown in U.S. Pat. No. 5,137,145 (Clopton). There, a conveyor system is disclosed having individual track members which are provided with channels and which have lips that protrude partially across the channels, causing the channels to be T-shaped in cross-section. A special attachment member, shown in FIG. 9, is provided with opposing prongs that engage the lips of opposing track members, thereby securing them together from the interior. Support brackets may be attached to the track members by a bolt whose flat, irregularly shaped head is disposed in one of the longitudinal channels in the track member. However, while the system disclosed in U.S. Pat. No. 5,137,145 (Clopton) is advantageous in some respects, the means disclosed therein for allowing the support members to be adjustably positioned along the length of the track is undesirable in that it requires special bolts which increase the manufacture and maintenance costs of the system.

Yet another problem with prior art conveyor systems is their extensive use of steel and other heavy and expensive materials. Such materials contribute directly to the cost of manufacturing, shipping, and assembling conveyor systems. In an effort to avoid these pitfalls, some conveyor systems have been developed using lightweight materials. Thus, U.S. Pat. No. 5,178,263 (Kempen) discloses modular track sections for an endless conveyor. The sections are made from high molecular weight plastic and are I-shaped in transverse cross-section. Each side of the track includes a longitudinal slot running the length of the track. A stainless steel mounting rail is disposed in each slot to strengthen the track. The mounting rail spans the abutment of adjoining track segments and is provided with a series of holes for receiving threaded bolts, thereby allowing the track segments to be joined together. A plurality of vertically disposed hangers are provided which allow the track to be supported from vertical posts.

While the references noted above disclose some features which are desirable for conveyor systems, however, none of these references disclose a convenient means for attaining variable track drops. In a conveyor system, such track drops are important, for example, to prevent runaway of carriers on a decline, and to facilitate wide wing transfer of carriers between tracks. In the past, track drops have been accomplished by custom designed track segments which add significantly to the cost and maintenance of the conveyor system, and detract from its versatility.

It is thus an object of the present invention to provide a conveyor system which avoids the aforementioned infirmities in the prior art, and which is provided with a convenient means for attaining variable track drops.

It is a further object of the present invention to provide a conveyor system in which the track segments may be releasably fitted together in an end-to-end fashion without welding and through the use of ordinary hand tools.

It is yet another object of the present invention to provide a conveyor system in which the support members may be releasably attached to the track without welding and through the use of ordinary hand tools.

It is another object of the present invention to provide a conveyor system in which the support members may be variably positioned along the length of the track.

It is still another object of the present invention to provide a conveyor system which is made out of lightweight materials which avoid the manufacture, distribution, and installation costs incurred through the use of steel and other heavy materials in a conveyor system, without sacrificing the strength and durability afforded by those materials.

These and other objects are achieved by the present invention, as hereinafter disclosed.

SUMMARY OF THE INVENTION

The present invention is an improved conveyor track system, particularly useful in conveyors of the power and free type, wherein the individual track segments are provided with longitudinal channels of T-shaped cross-section that are offset from the centerline of the track. Abutting track segments are secured together by means of rectangular splice bars that are disposed in the longitudinal channels and that span the joints between abutting track members. The splice bars are provided with threaded apertures which rotatingly engage a series of bolts which fix the splice bars in place.

The track system is provided with a series of yokes which add support and rigidity to the track, and which may be used to maintain a desired distance between a power track and a free track. The yokes are connected to the track by means of bolts which rotatingly engage rectangular connector bars disposed in the longitudinal channels of the track segments. The connector bars slide freely along the longitudinal channels while the bolts are only loosely engaged, thereby permitting the yokes to be adjustably positioned at any convenient location along the length of the track.

The yokes of the present conveyor system are provided with multiple, vertically aligned apertures through which the bolts may be inserted to engage the connector bars in the power track. This feature is used in conjunction with the offset feature of the longitudinal channels to attain certain predetermined track drops.

The conveyor system of the present invention may be assembled through the use of ordinary hand tools, and without the need for welding, into almost any configuration dictated by design constraints. The system is modular, allowing most track configurations to be assembled from a small variety of interchangeable parts, and is easily disassembled without damaging the component parts, thereby allowing these parts to be reused in other systems. The conveyor system is also constructed out of tough, lightweight materials, thereby avoiding some of the costs incurred in the manufacturing, distribution, and assembly of conveyors made from steel and other heavy materials, while sacrificing little in the way of strength or durability.

All figures are drawn to scale.

DETAILED DESCRIPTION OF THE PREFERRED EMBODIMENT

The present invention is a conveyor system, the track of which is provided with a unique offset feature that may be used in conjunction with specially designed yokes to attain certain predetermined track drops. The conveyor system is designed so that it can be assembled and installed on site without welding and without the need for special tools or equipment.

While the invention is specifically described herein with reference to the type of power and free conveyor system disclosed in U.S. Pat. No. 3,559,585 (Lempio), the present invention is not limited to this type of conveyor system, but instead is applicable to a wide variety of conveyors, including overhead and inverted Unibilt® (a trademark of the Jervis B. Webb Co.) conveyors, overhead and inverted power and free conveyors, over/under conveyors, and I-beam conveyors. In addition, the component parts of the present invention may be used as replacement items for existing conveyor systems.

Figure 1:
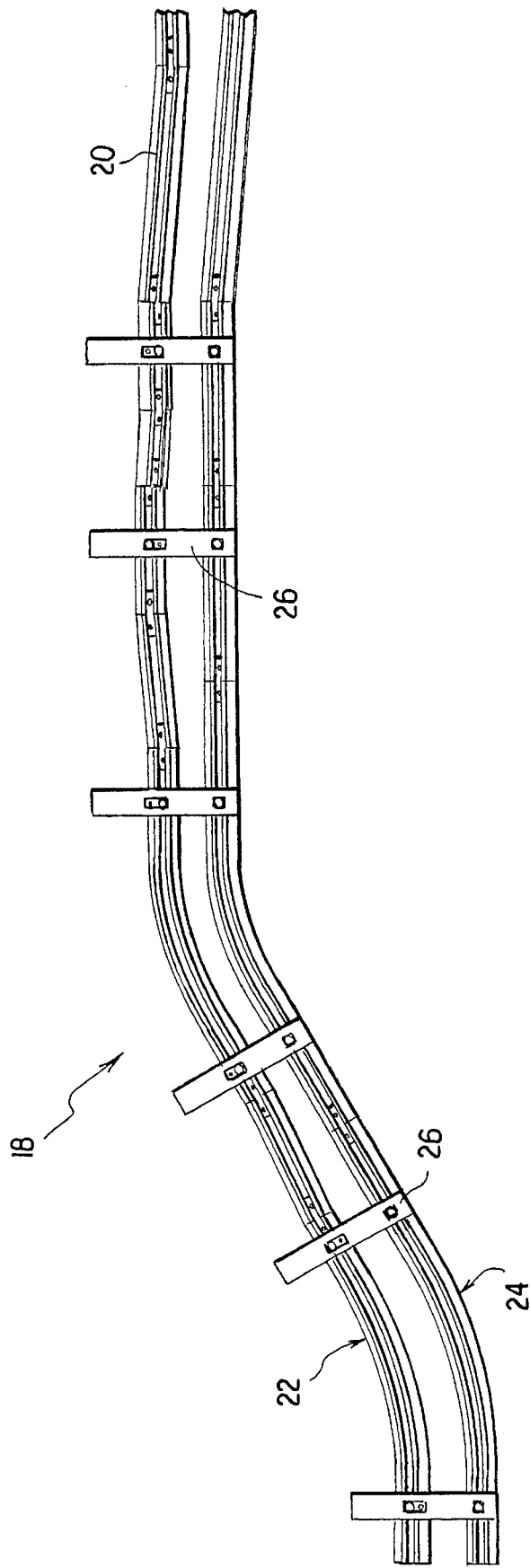
FIG. 1 is a side view of the conveyor system of the present invention, showing various track drops and rises which may be affected.

FIG. 1 illustrates the use of the present invention in a conveyor system S of the power and free type. The conveyor system comprises a series of track segments 20 which are assembled in an end-to-end fashion into a power track 22 and a free track 24. The power track and free track are vertically spaced from each other in an approximately parallel manner. The free track houses the wheels of a trolley carrier of the type shown in FIG. 5, while the power track houses a chain assembly of the type shown in FIG. 6 which is used to push the trolley.

Referring again to FIG. 1, the conveyor system of the present invention is provided with a plurality of yokes 26 disposed at intervals along the length of the tracks. The yokes support the power and free tracks at a desired spacing from each other, while also adding rigidity and support to the system. The yokes may be adjustably positioned along the length of the track, so that the distance between the yokes may be varied as dictated by design constraints. Thus, for example, the positions of the yokes may be adjusted from their normal spacing to accommodate peripheral devices, transfer points, and other interferences.

Figure 2:
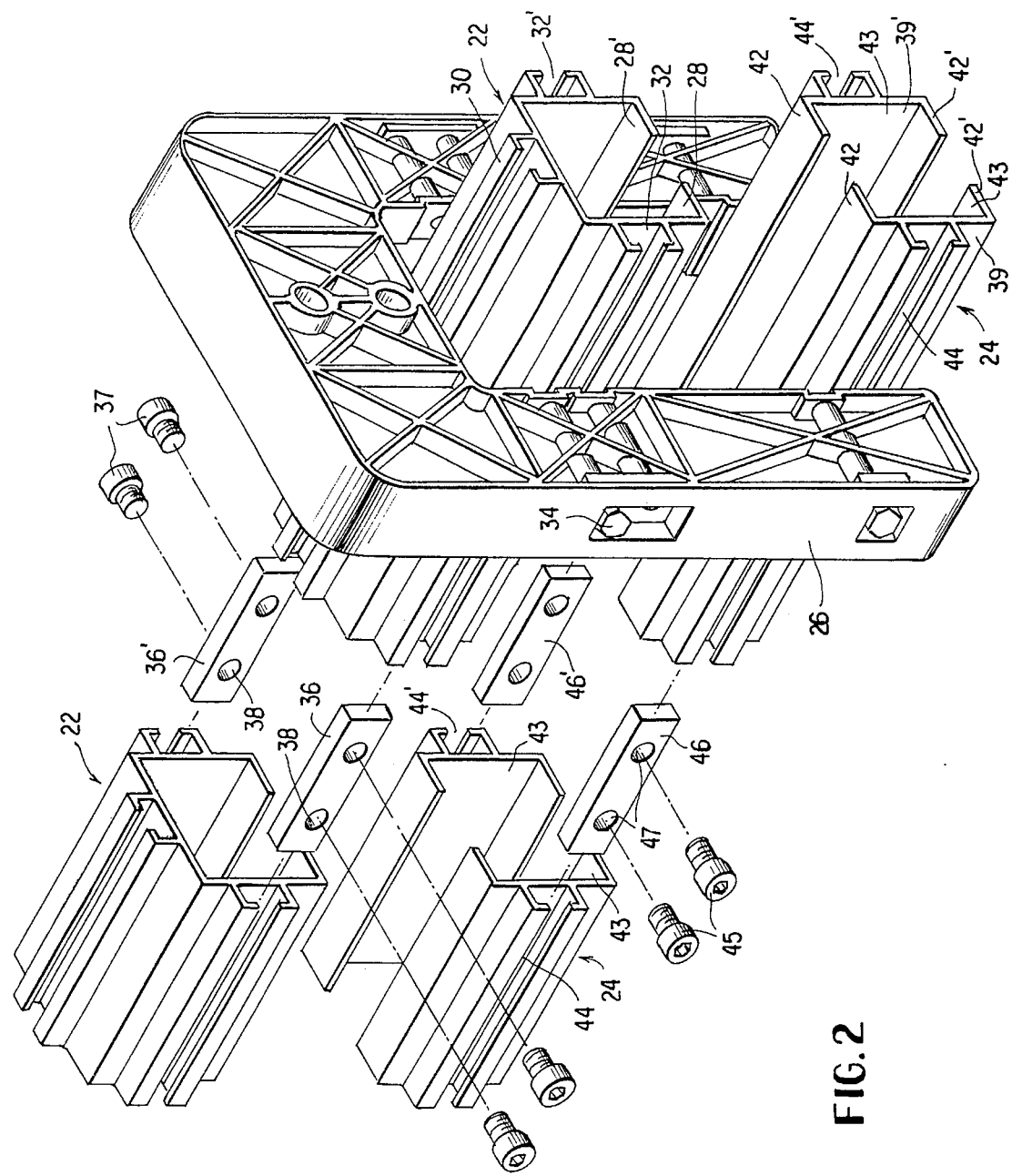
FIG. 2 is an exploded view of the conveyor system of the present invention which illustrates the end-to-end attachment of the track segments, and the attachment of the yokes to the rail segments.
Figure 3:
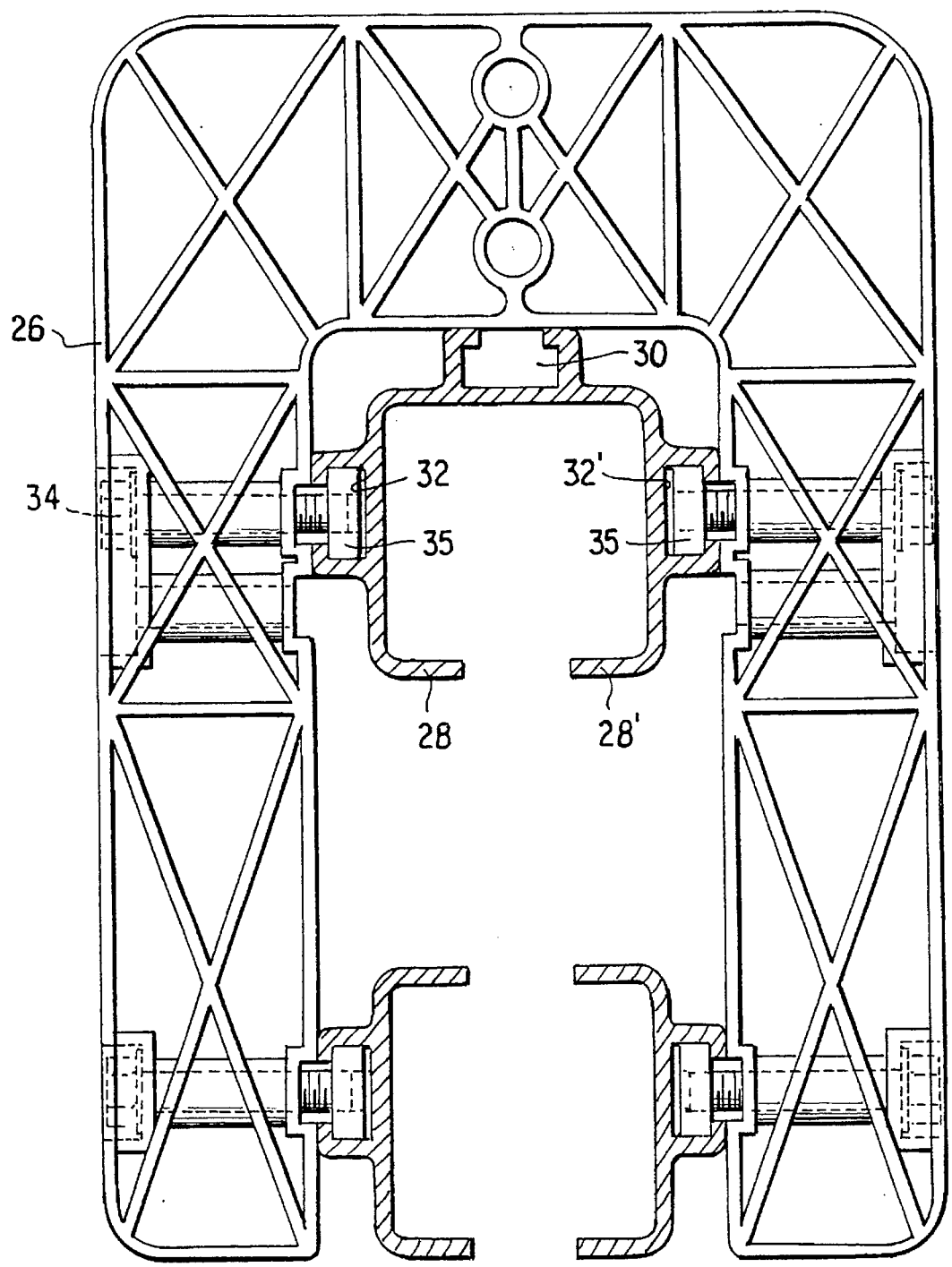
FIG. 3 is a transverse view, partially in section, of a yoke of the present invention used with a power track of C-shaped cross-section and a conveyor track of U-shaped cross-section.

The conveyor system of the present invention differs from conventional systems in the offset feature of the track and in the means by which the track segments are connected to each other and to the yokes. Referring to FIGS. 2–3, the power track 22 of the conveyor system is provided in one embodiment with opposing flanges 28, 28' so that it is C-shaped in cross-section. The power track is extruded with a longitudinally extending top T-slot 30 and a pair of longitudinally extending side T-slots 32, 32'. The top T-slot allows the bolted attachment of the power track to support hangers, in contrast to conventional systems wherein the support hangers are welded to the top of the power track. Similarly, the side T-slots 32, 32', which are asymmetrically disposed between the flanges 28, 28', allow the side attachment of the yokes to the power track by means of bolts 34 or other suitable attaching means which engage the threaded apertures of connector bars 35 disposed in the side T-slots. The top and side T-slots also allow for the end-to-end connection of track sections by means of splice bars 36' inserted into these slots and clamped therein by bolts 37 which engage threaded holes 38 in the splice bars.

The free track 24, which is vertically disposed below the power track, consists of a pair of transversely spaced track members 39, 39' fitted with opposing upper and lower flanges 42' which define longitudinal channels 43, U-shaped in cross section, that house the wheels of a load bearing trolley. The free track members are extruded on each side with longitudinally extending side T-slots 44, 44'. The side T-slots allow the track members to be connected in an end-to-end fashion by means of bolts 45 or other suitable fastening means which engage threaded holes 47 in splice bars 46, 46' inserted into the side T-slots. The track members are fastened to the yokes in a similar manner. The use of the splice bars for track joints allows for the rapid assembly of track segments into a unified conveyor system. Furthermore, the splice bars provide for proper self-alignment of the track sections and improved lateral support.

Figure 4:
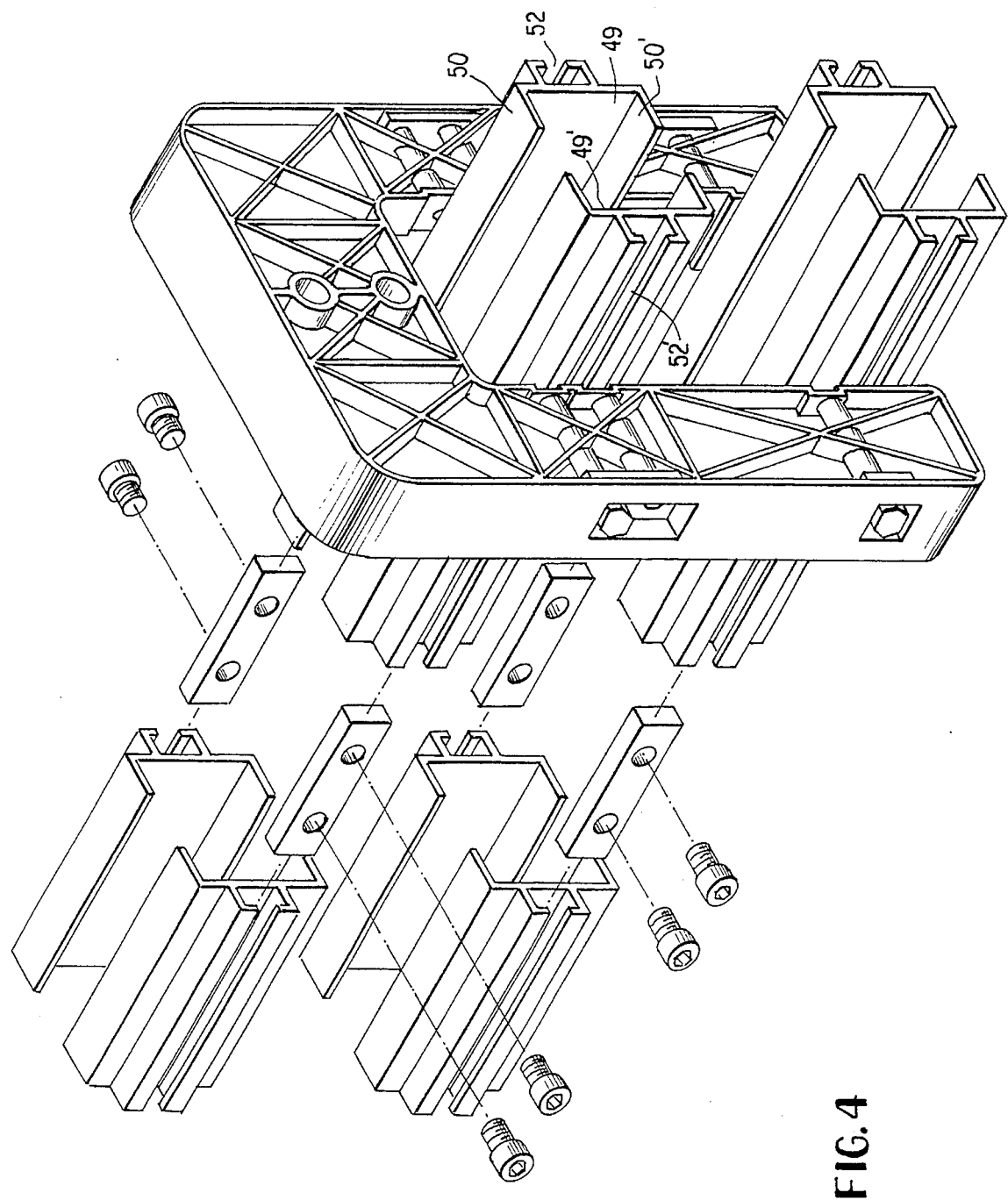
FIG. 4 is an exploded view of a yoke of the present invention used with a power track of U-shaped cross-section and a conveyor track of U-shaped cross-section.

FIG. 4 shows a second embodiment of the power track of the present invention. In this embodiment, the power track consists of a pair of transversely spaced track members 49, 49' which are provided with opposing upper and lower flanges 50, 50' so that they are U-shaped in cross section. The track members are extruded on each side with longitudinally extending T-slots 2, 52' which are asymmetrically disposed between the opposing flanges of the track. While the embodiment is shown as having a single T-slot on each track member, the present invention contemplates other embodiments wherein two T-slots are provided. Such an embodiment may be particularly useful in pickup and other applications, and in the support of peripheral devices.

FIGS. 2–4 illustrate some of the advantages of the present invention regarding the installation of the conveyor system.

Because the track segments are joined together using splice bars and conventional threaded bolts or similar fastening means, the installation of a conveyor system in accordance with the present invention is possible without the welding operations required in conventional track systems such as that shown in U.S. Pat. No. 3,559,585 (Lempio). Also, the conveyor can be readily disassembled or reconfigured by unbolting the splice bars. This greatly facilitates the repair or reconfiguration of the system, and allows component parts of the system to be reused in other systems, instead of having to be scrapped. Finally, since the conveyor system may be constructed from a small variety of inexpensive parts, the user may feasibly maintain an inventory of spare parts for the system, thereby reducing down time when repairs or modifications are required.

Figure 5:
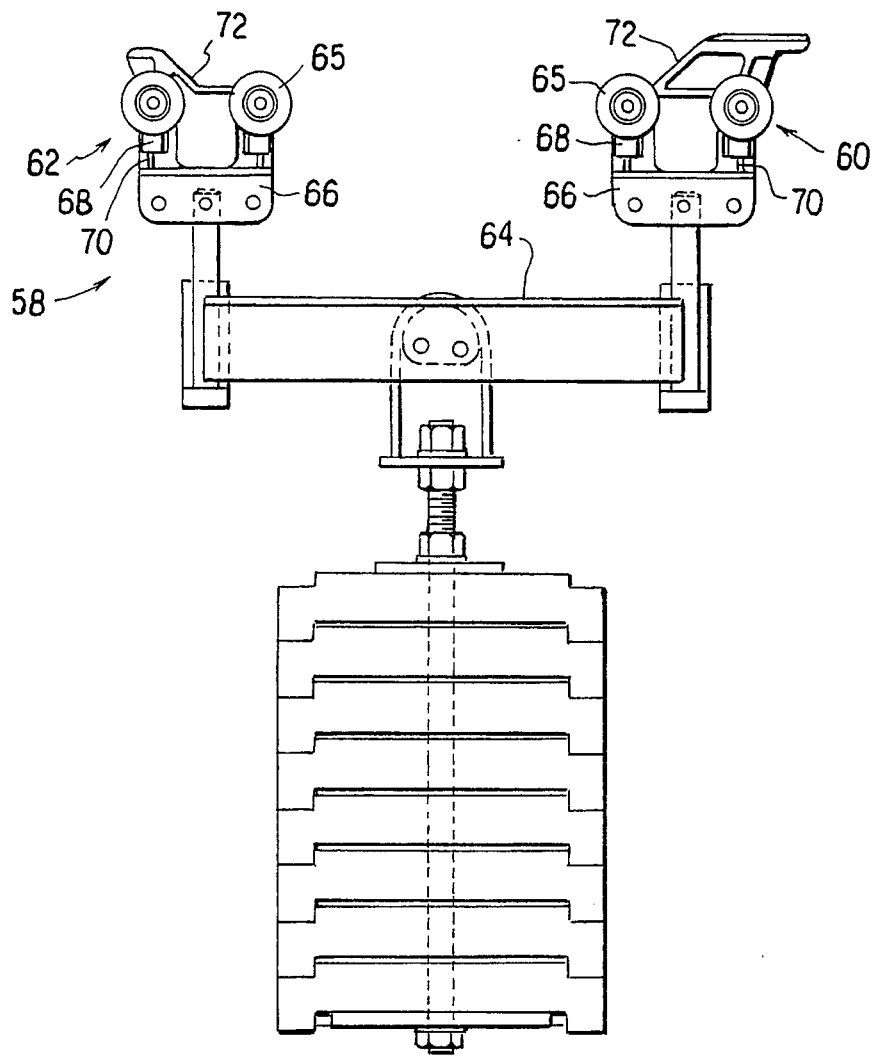
FIG. 5 is a side view of a trolley assembly which may be used with the conveyor system of the present invention.

As shown in FIG. 5, the carriers 58 used with the conveyor of the present invention are of the multiple trolley type, and have a front trolley 62 and a rear trolley 60 which are connected by a load bar 64. Each trolley consists of opposing pairs of wheels 65 mounted on a trolley bracket 66 and equipped with a guide roller 68 set on a guide pin 70. The trolleys are preferably configured with nylon wheels. However, wheels made from other materials, including metal alloys, plastics, rubbers, and composite materials, may also be suitable for certain applications. Any of these materials may also be used in the trolley assembly 72 and the pusher dogs on the chain (see FIG. 6).

Figure 6:
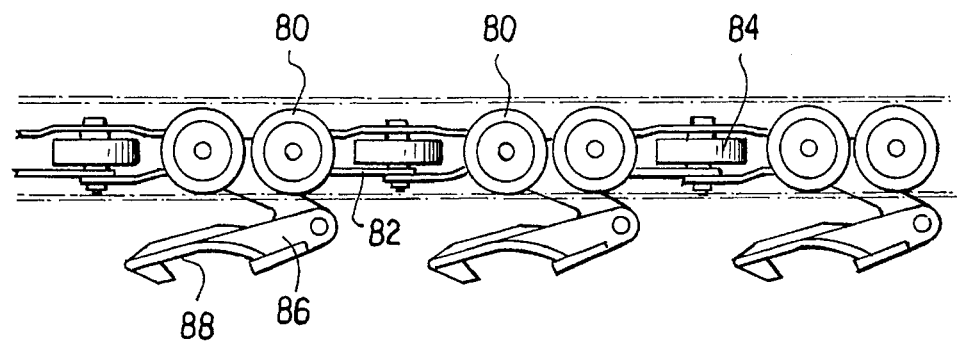
FIG. 6 is a schematic drawing of a chain assembly which may be used with the trolley system of the present invention.

FIG. 6 illustrates the chain assembly which may be used with the trolley system of the present invention. The chain assembly consists of a series of load wheels 80 connected by a link assembly 82, and a series of guide wheels 84 set at a 90° angle to the load wheels. The chain assembly is provided with a jointed arm 86 terminating in a hooked portion 88 that allows the chain assembly to engage and push the trolley assembly. Various motors may be used to drive the chain assembly. These include linear motors of any configuration based on system requirements that can be fabricated and applied to aluminum conveyors.

Figure 7:
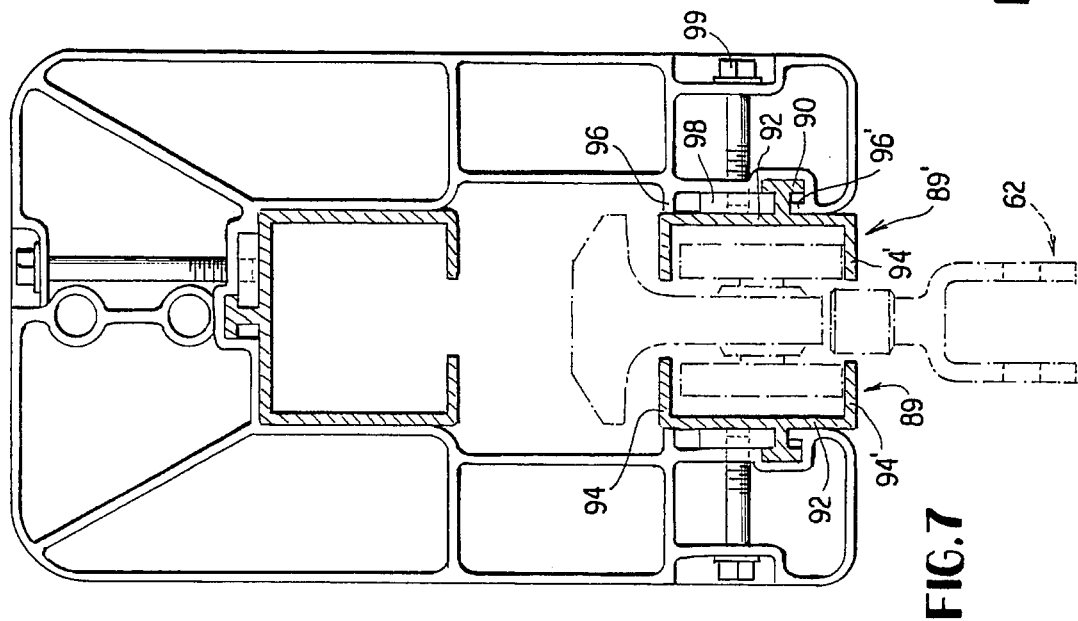
FIG. 7 is a transverse view, partially in section, showing the disposition of the trolley assembly within the free track.

FIG. 7 shows the disposition of trolley 72 relative to the free track. The spacing between the opposing track members 89, 89' is such that the opposing wheels of the trolley are housed in the opposing channels of the free track, allowing the lower flanges 94' of the free track to serve as a load bearing surface.

FIG. 7 also illustrates a second embodiment of the track of the present invention. Instead of being fitted with longitudinal channels, the track segments may be fitted with a longitudinal protrusion 90 that is T-shaped in cross-section and is positioned on the track body 92 in such a way that it is displaced from the centerline between the flanges 94, 94'. When this type of track is used, the yokes may be provided with ridges 96, 96' that act in conjunction with a connector bar 98 and a bolt 99 to secure the yoke to the track. In this embodiment, the connector bars are disposed in the channel bounded by the track body 92, the protrusion 90 and the ridge 96.

Figure 8:
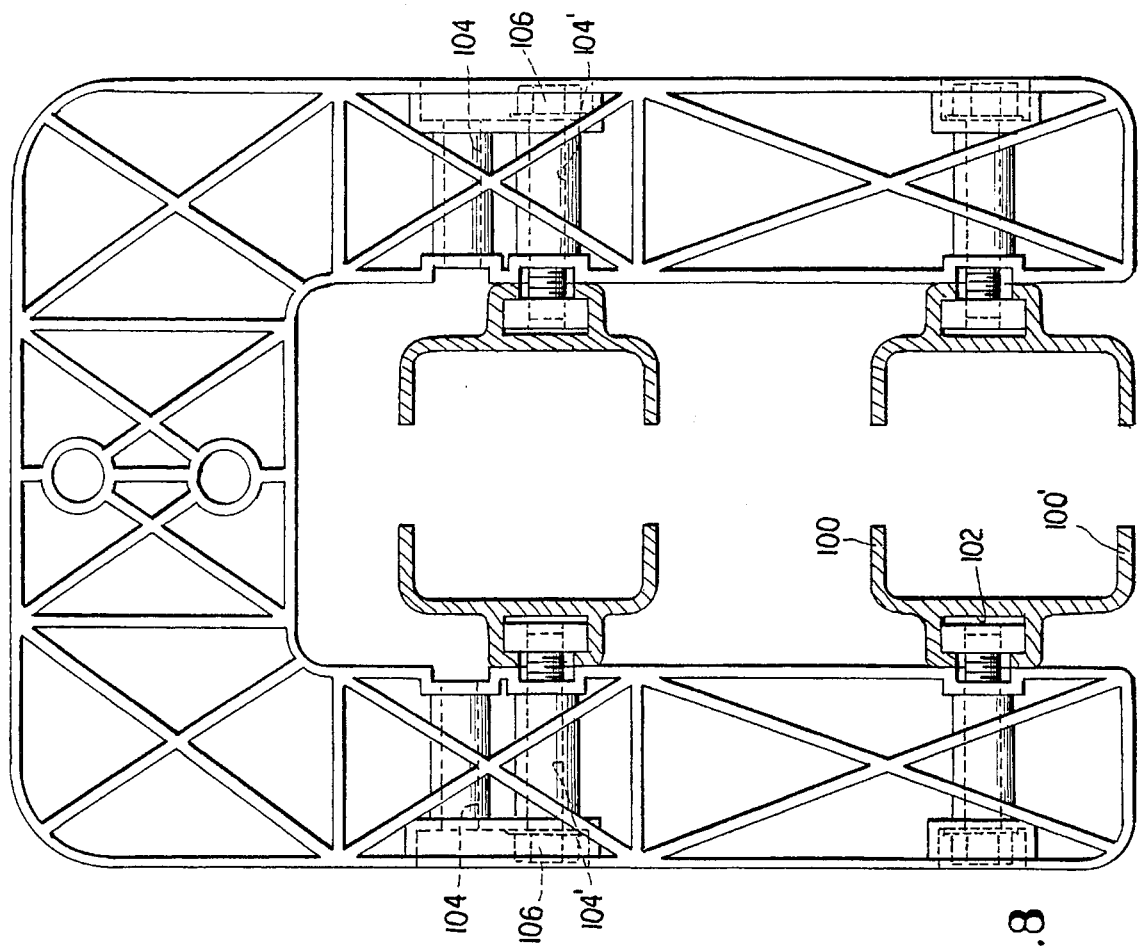
FIG. 8 is a transverse view, partially in section, showing the placement of the power and free tracks in a yoke to achieve a 4.875" drop.

FIG. 8 illustrates the use of the offset feature of the track of the present invention in conjunction with the yokes to attain a variable track drop, defined as the vertical distance between the lower flange on the power track and the lower flange on the free track. As shown in FIGS. 8–11, the side of the yokes are provided with first and second apertures 104, 104' into which bolts 106 may be inserted to secure the track to the yokes. The track drop may be adjusted by using one aperture or the other and by flipping the track segment so that the T-slot is closer to the upper or lower flange. Thus, for example, track drops of 4.5", 4.875", and 5.375" may be achieved.

FIG. 8 shows a track drop of 4.875". The 4.5" drop and the 5.375" drop are achieved by moving the power track to the top or bottom set of holes in the yoke, respectively, and keeping the free channel oriented in such a way that the T-slot is closer to the top of the free track. The 4.875" drop is achieved by inverting the free track so that the T-slot is closer to the bottom of the free track rather than the top.

Figure 10:
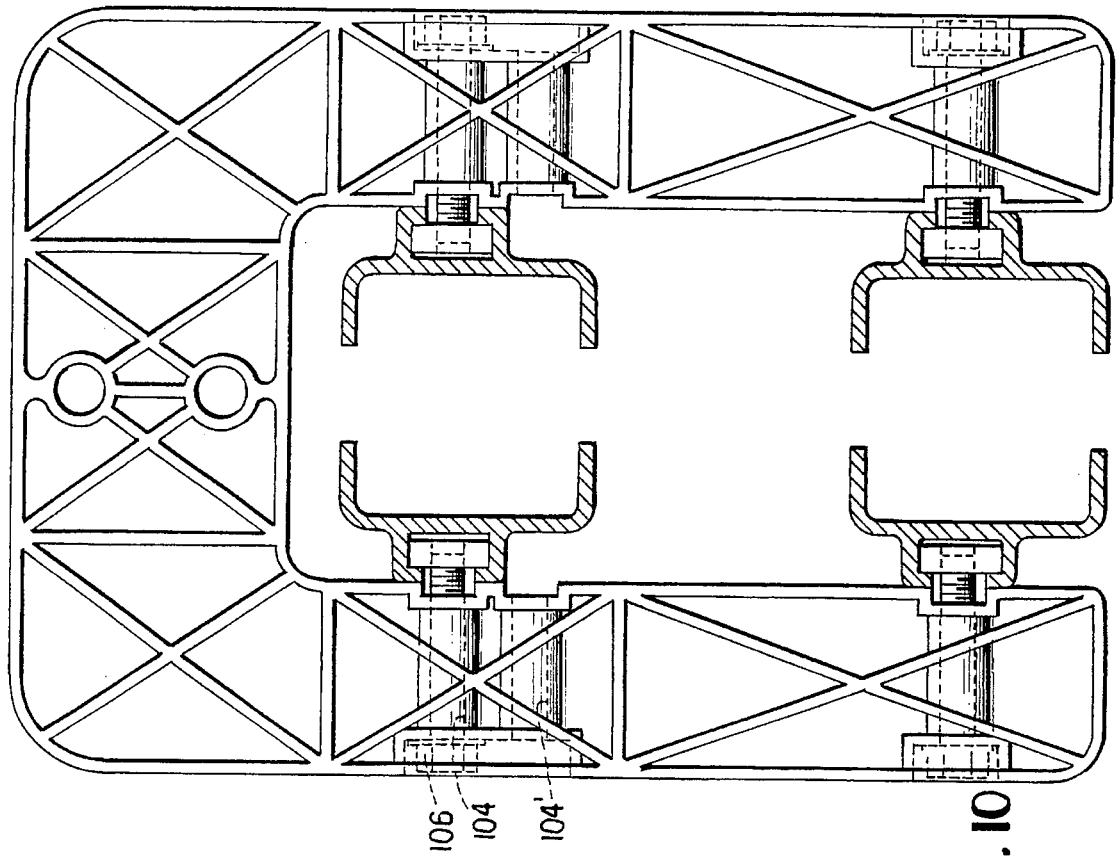
FIG. 10 is a transverse view, partially in section, of the portion of the conveyor system shown in FIG. 9.
Figure 9:
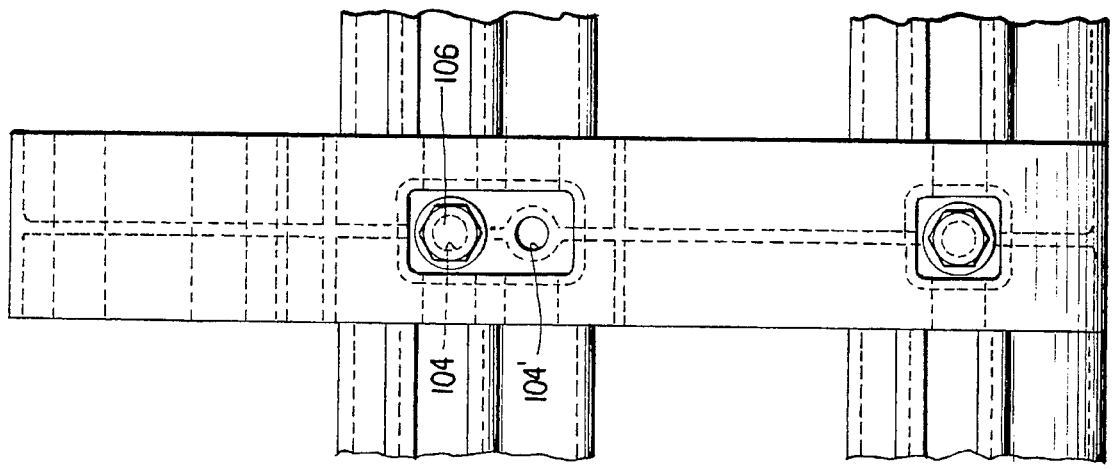
FIG. 9 is a side view showing the placement of the power and free tracks in a yoke to achieve a 5.375" drop.

FIGS. 9–10 illustrates the use of the yokes in conjunction with the offset feature of the track to achieve a 5.375" drop. The drop is achieved by moving the power track to the top set of holes in the yoke and keeping the free channel oriented in such a way that the T-slot is closer to the top of the free track.

Figure 11:
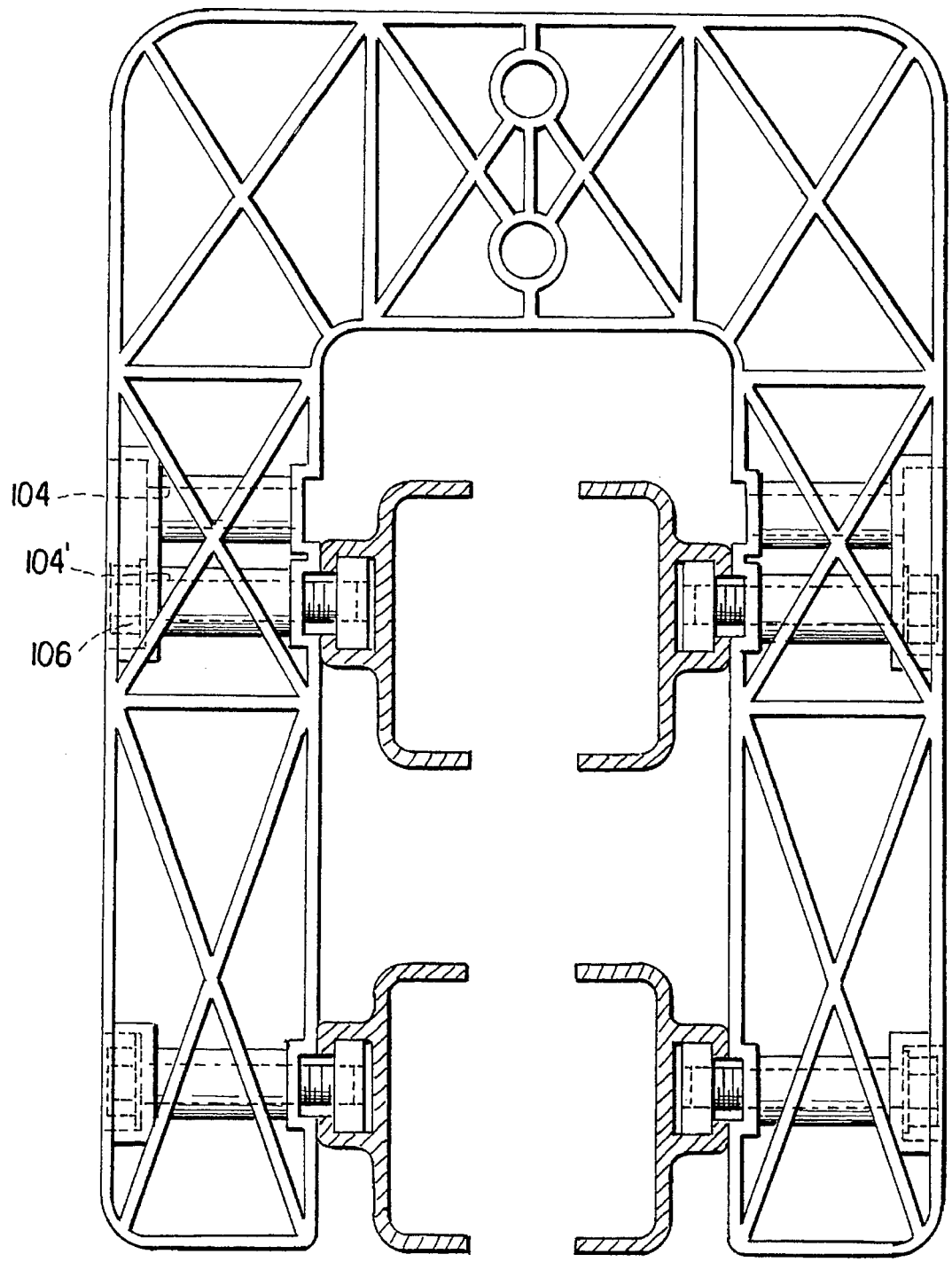
FIG. 11 is a transverse view, partially in section, showing the placement of the power and free tracks in a yoke to achieve a 4.5" drop.

FIG. 11 illustrates the use of the yokes in conjunction with the offset feature of the track to achieve a 4.5– drop. The drop is achieved by moving the power track to the bottom set of holes in the yoke and keeping the free channel oriented in such a way that the T-slot is closer to the top of the free track.

Figure 12:
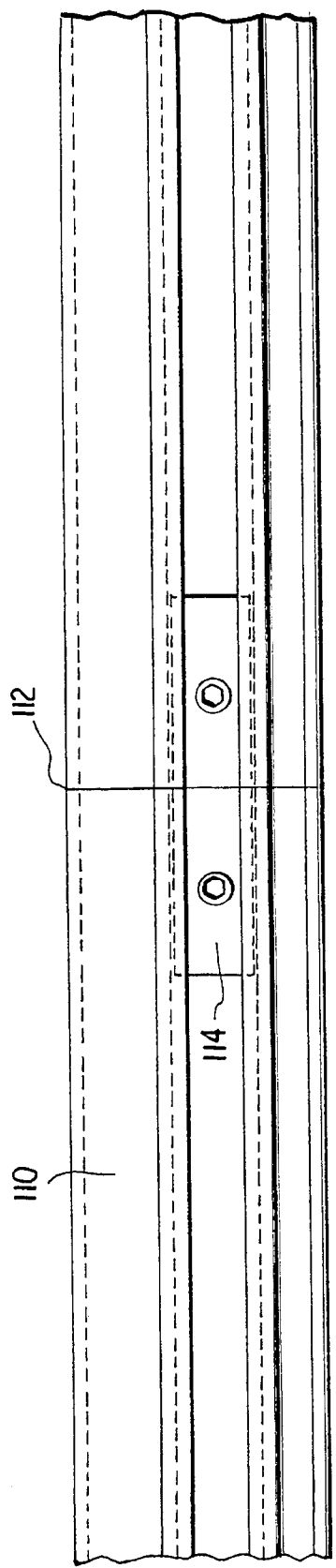
FIG. 12 is a side view showing the end-to-end attachment of two track segments with a splice bar.
Figure 13:
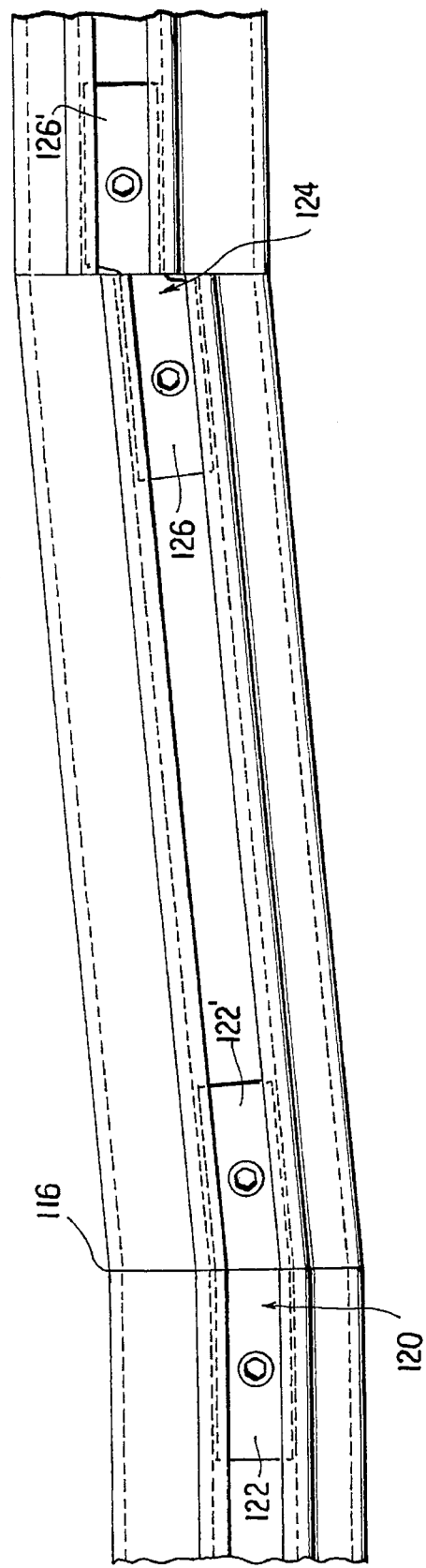
FIG. 13 is a side view showing the end-to-end attachment of track segments with an angled splice bar to achieve a 5° offset, and a second splice bar that may be used for the end-to-end connection of track segments whose T-slots are not in alignment.

FIGS. 12–13 further illustrate the use of the splice bars to join abutting track segments in the conveyor system of the present invention. In a straight portion of the track 110, as shown in FIG. 12, abutting track members are joined across a 180° joint 112 by a rectangular splice bar 4. However, when it is desired to create an offset between adjoining track members, as in FIG. 13, a track member may be used which is offset in such a way that it joins the abutting track member at a joint 16 whose angle is less than, or greater than, 180°. In this case, an angled splice bar 120, which consists of a plate which is divided into two segments 122, 122' that are offset at the same angle as that of the joint, is used. The offsets so achieved include the standard offsets of ½", ⅞", 1.5", and 2" although other offsets are also possible When the abutment between adjoining track segments is such that the T-slot on the two track members are not in alignment, also shown in FIG. 13, a special splice bar 124 is used, the plates 126, 126' of which are joined together in a disjointed fashion.

Figure 14:
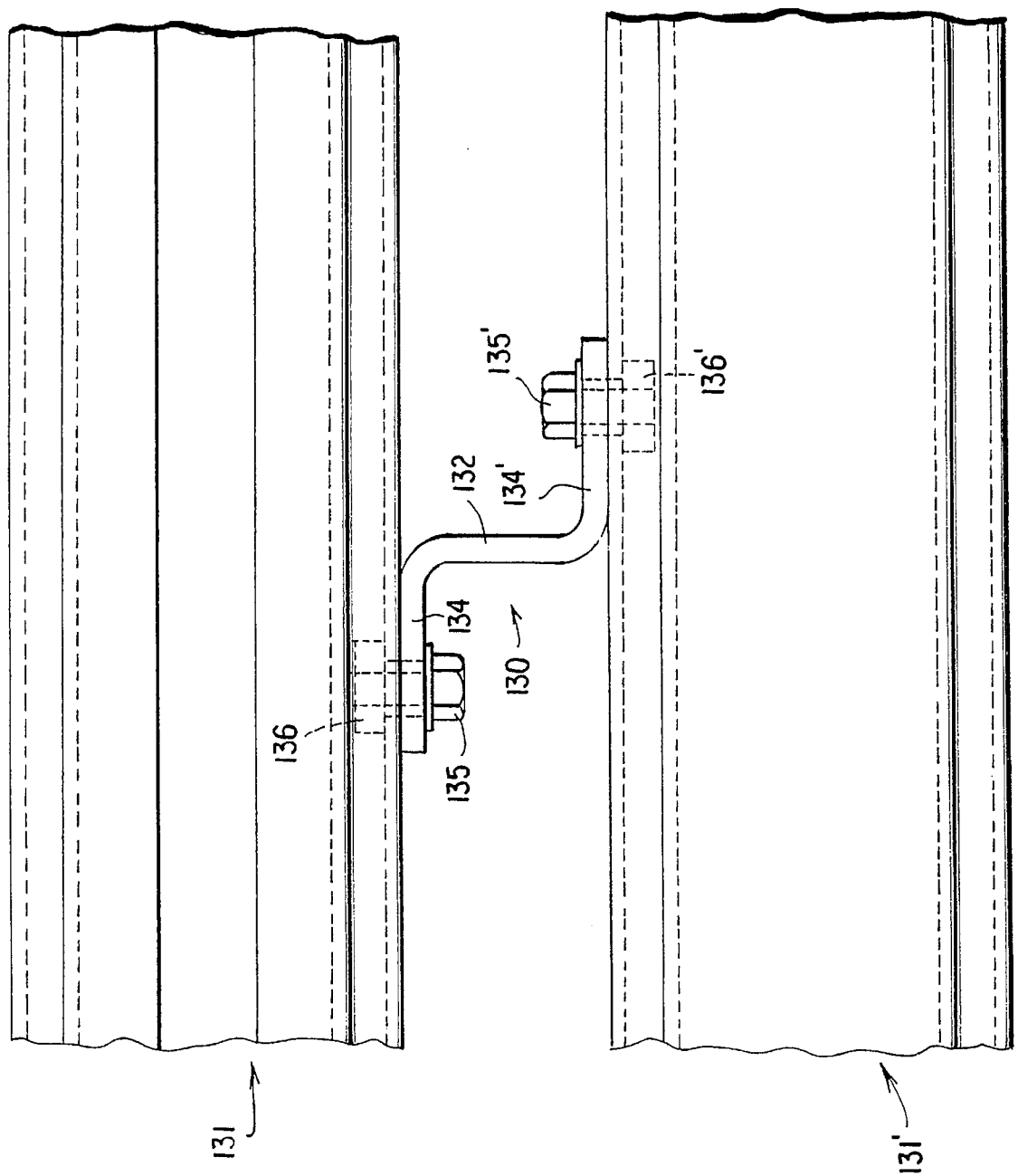
FIG. 14 is a plan view of a connector strip that may be used in place of a yoke in certain situations to secure two tracks together.

FIG. 14 illustrates the use of a Z-shaped connector strip 130 to secure two track segments 131, 131' together in parallel. The connector strip consists of a central portion 132 terminating on each end in a flange 134, 134' which is secured by bolts 135, 135' or other suitable fastening means to connector bars 136, 136' disposed in the T-slots of each track segment. The Z-shaped connector strip is particularly useful in providing proper support and track separation when use of a hanger is not desirable or not practical.

Figure 15A:
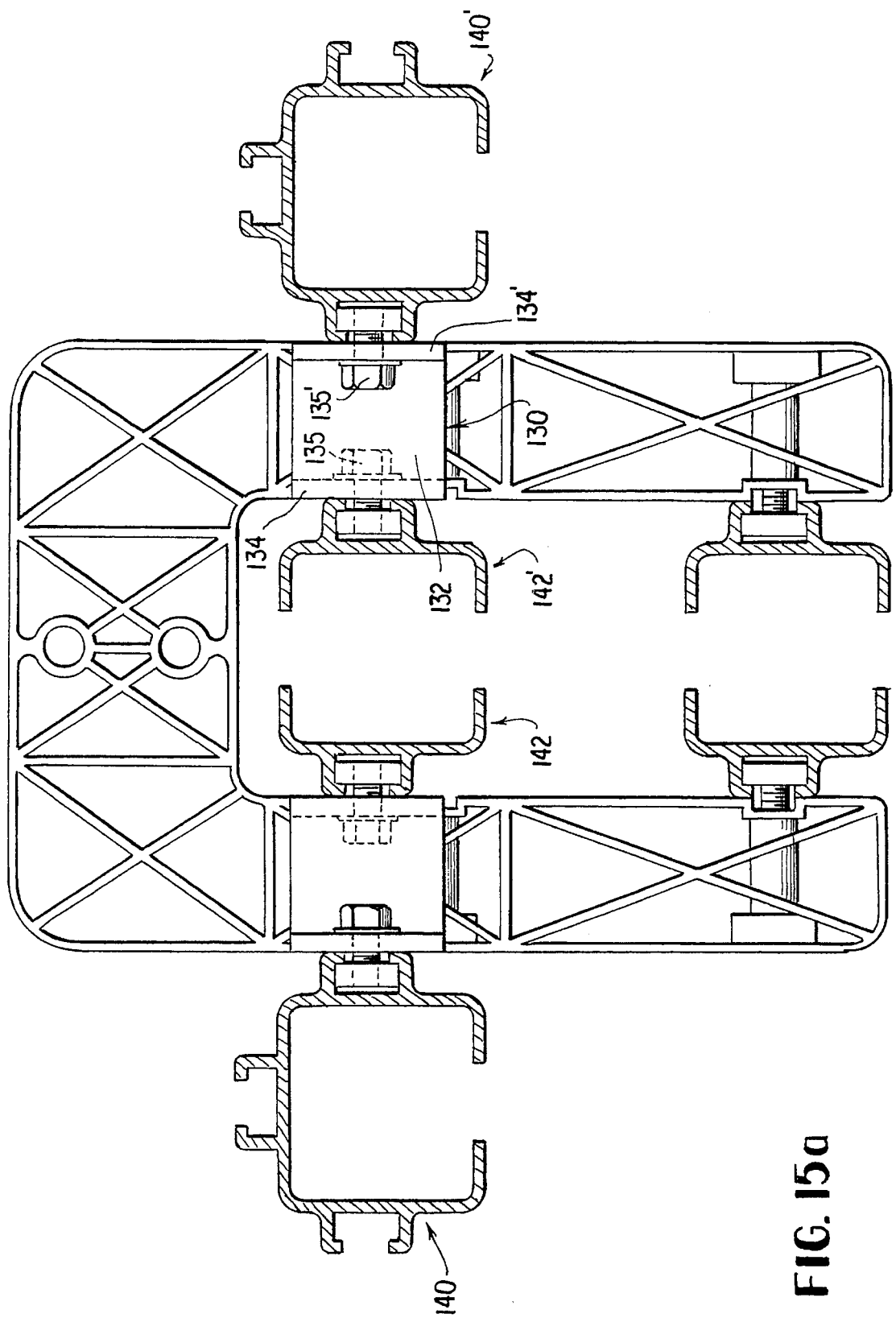
FIG. 15a is a transverse view, partially in section, showing the use of the connector strip of FIG. 14 in the attachment of additional rails to the outside of a yoke.
Figure 15B:
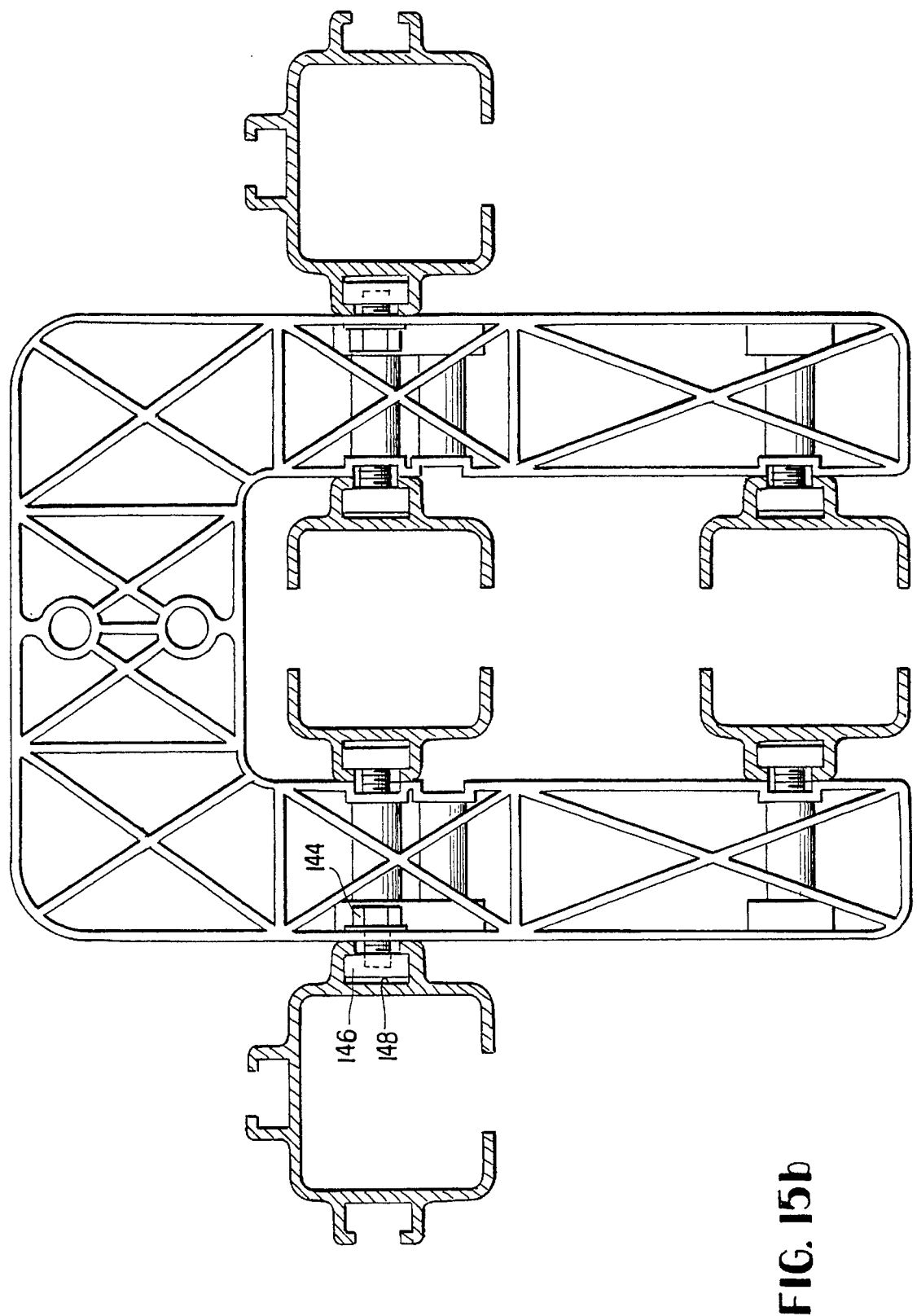
FIG. 15b is a transverse view, partially in section, showing the attachment of additional rails to the outside of a yoke.

As shown in FIG. 15a, the Z-shaped connector is particularly useful for supporting additional tracks 140, 140' in a fixed relation to central tracks 142, 142' supported on a yoke. As shown in FIG. 15b, the same effect may be attained in some situations by attaching the additional tracks directly to the side of the yoke. Preferably, this is accomplished through the use of a bolt 44 or other suitable fastening means which extends through an aperture provided in the side of the yoke and rotatingly engages the threaded apertures of a connector bar 146 disposed in the T-slot 148 of the additional track.

The materials used for the yokes, channels, stops, switches, trolleys, wheels, and other components of the conveyor system of the present invention are interchangeable and include aluminum, plastic, ceramics, composite materials, and die cast, carbon, or stainless steel. However, it is preferred that the tracks are made out of aluminum or its alloys. This allows for a lightweight system that is easier to ship and assemble.

It is also preferred that the yokes are made out of a suitable engineering plastic such as Delrin® or similar acetyl resins. Such resins are moldable and have excellent tensile strength, fatigue resistance and toughness, and significantly reduce the overall weight of the system, thereby permitting the use of less header steel and reducing installation costs. Furthermore, a plastic yoke may serve as a form of insulation in certain situations such as customer welding.

The construction of the system of the present invention is designed so that the conveyor system may be easily assembled, disassembled, or modified on site through the use of normal hand tools. Thus, the design of the conveyor system of the present invention allows for the easy changing of support centers without the need for special equipment. The yokes can be connected with ease at any location along the longitudinal slot to provide greater strength where needed. Various peripheral devices, including snap-in or snap-on devices used to maintain track guarding, seals, limit switches, stops, shrouding, and the like, may also be adjustably disposed anywhere along the longitudinal T-slots.

Furthermore, a conveyor system in accordance with the present invention can utilize standard general components to minimize variation in parts, thereby making it more feasible for the user to maintain a stock of replacement parts and particular components, and allows anti-backups to be easily moved as the system is either changed or modified by the user.

The present invention also contemplates the use of other components as are known to the art of conveyor systems, including spring-loaded parts, stabilizers, tool rails, slide-in pieces, snap-on attachments of various types, plastic spacers, noise dampening devices (which may be in the form of strips of noise dampening material disposed along the channels), runway surfaces (i.e., steel strips to reduce wear on aluminum in heavy load applications) to allow for easy replacement of heavy duty wear areas, mini-extractors in the form of telescoping forks, and pressure sensitive strips, buttons, or other devices which may be added for safety purposes. If necessary, as for lubrication purposes, drip pans can be added to the channels, and outboard rails pushed by dogs may be provided if necessary to transport trays, turntables, lifts, and side-shifting spurs. Furthermore, some parts may be designed as self-locating, so that there would be only one location that the particular type of component could be attached to the conveyor.

Because most of the components of the conveyor system of the present invention are preferably made out of plastic or aluminum, they do not require painting. Consequently, while the conveyor system of the present invention may be used in almost any conventional conveyor application, it is particularly useful in applications, such as those involving food preparation and clean room atmospheres, which currently utilize ionized aluminum.

The yokes of the invention can also be modified as required by specific applications. Thus, for example, the yokes could take the form of flat plates or other aluminum extrusions as dictated by design needs. The yokes could be modified with double flanges to stiffen the bearing area for the bolts, or could be modified to allow the spacing of channels to achieve wide track stability in inverted configurations so that the track area around turns could be increased if needed with little expense. In certain situations, as when the channels are buried in the floor to create a towveyor application, use of the yokes may be avoided altogether.

In some applications, the aluminum channels of the conveyor system of the present invention could form a reaction plate for EMS electrification. Electrically conductive plastic, with stainless steel wiper brushes, could be used for grounding. In such an applications, it would be possible to replace the power track with a bus rail with snap-on electrification for both overhead and inverted systems. The EMS drive wheel could be located inside the channel or outside with electrification running either on the top or inside the channels.

The above disclosure is illustrative of the features of the present invention, and is not intended to be limiting. Therefore, the scope of the present invention should be construed solely by reference to the appended claims.

What is claimed is:

1. A track segment for a conveyor system, comprising:
 a longitudinal track body having
  a first side;
  a second side; and
  a back side;
 wherein said first and second sides extend outwardly in the same direction from said back side; and
  attachment means disposed on said back side extending oppositely from said first and second sides, for attaching said track body to a support structure;
  wherein said attachment means is offset from the centerline between said first and second sides.

2. The track segment of claim 1, wherein said track segment is approximately U-shaped in cross section.

3. The track segment of claim 1, wherein said first side and said second side extend longitudinally.

4. The track segment of claim 3, wherein said first side and said second side are substantially parallel.

5. The track segment of claim 1, wherein said attachment means comprises a longitudinal channel.

6. The track segment of claim 5, wherein said channel is bounded by a longitudinally extending upper wall and a longitudinally extending lower wall.

7. The track segment of claim 6, wherein said upper wall and said lower wall are substantially parallel.

8. The track segment of claim 7, wherein said upper wall is provided with a first longitudinally extending flange that extends approximately perpendicular to said upper wall.

9. The track segment of claim 7, wherein said lower wall is provided with a second longitudinally extending flange that extends approximately perpendicular to said lower wall.

10. The track segment of claim 5, wherein said channel is approximately T-shaped in cross section.

11. The track segment of claim 5, wherein said attachment means comprises a longitudinal protrusion.

12. The track segment of claim 11, wherein said protrusion comprises a ridge extending from said track body, and at least one longitudinal flange extending approximately perpendicular to said ridge.

13. The track segment of claim 11, wherein said protrusion is approximately T-shaped in cross section.

14. The track segment of claim 1 wherein said attachment means is disposed on said back side between said first and second sides.

15. A conveyor system, comprising:
 at least one track segment of approximately C-shaped cross section, said track segment comprising
  a first side;
  a second side; and
  a back side;
  wherein said first and second sides extend outwardly in the same direction from said back side; and
  attachment means disposed on said back side extending oppositely from said first and second sides, for attaching said track body to a support structure;

wherein said attachment means is offset from the centerline between said first and second sides.

16. The conveyor system of claim 15, wherein said attachment means comprises a longitudinal channel of approximately T-shaped cross section.

17. The conveyor of claim 15, wherein said attachment means comprises a longitudinal protrusion of approximately T-shaped cross section.

18. The conveyor system of claim 15, wherein said support structure comprises at least one yoke.

19. The conveyor system of claim 18, wherein said attachment means comprises a longitudinal channel, and a connector bar disposed in said channel.

20. The conveyor system of claim 19, wherein said yoke is provided with a plurality of apertures, and wherein said attachment means further comprises at least one bolt which extends through one of said apertures and engages a threaded aperture in said connector bar.

21. The conveyor system of claim 20, wherein said apertures are vertically disposed relative to one another.

22. The track segment of claim 15 wherein said attachment means is disposed on said back side between said first and second sides.

23. A power and free conveyor system, comprising:

a first track having at least one track member a second track;

a plurality of yokes;

wherein said track member comprises:

a first side;

a second side; and a back side;

wherein said first and second sides extend outwardly in the same direction from said back side; and attachment means for connecting said track member to said yokes; wherein said attachment means is asymmetrically disposed on said back side and extends oppositely from said first and second sides.

24. The conveyor system of claim 23, wherein said first track comprises a plurality opposing of said track members and said second track has at least one track member and second attachment means.

25. The conveyor system of claim 24, wherein said attachment means comprises a longitudinal channel of T-shaped cross section.

26. The conveyor system of claim 24, wherein said attachment means comprises a longitudinal protusion of T-shaped cross section.

27. The conveyor system of claim 24, wherein said track member of said second track is approximately C-shaped in cross-section.

28. The conveyor system of claim 27, wherein said second attachment means for said track member of said second track comprises a longitudinal channel of approximately T-shaped cross section.

29. The conveyor system of claim 27, wherein said second attachment means comprises a longitudinal protrusion of approximately T-shaped cross section.

30. The conveyor system of claim 24 wherein said members of said first track and said second track may have either the same or different cross sections.

31. The conveyor system of claim 30, wherein said second track comprises a plurality of opposing said track members.

32. The conveyor system of claim 31, wherein said second attachment means for said track member of said second track comprises a longitudinal channel of approximately T-shaped cross section.

33. The conveyor system of claim 31, wherein said second attachment means comprises a longitudinal protrusion of approximately T-shaped cross section.

34. The conveyor system of claim 30, including first attaching means for attaching said track members in an end-to-end fashion.

35. The conveyor system of claim 34, wherein said attachment means for said track members of said first track comprises a longitudinal channel, and said first attaching means comprises a splice bar disposed in said channel and at least one bolt for rotatingly engaging a threaded aperture in said splice bar.

36. The conveyor system of claim 35, including first attaching means for attaching said track members in an end-to-end fashion.

37. The conveyor system of claim 36, wherein said attachment means for said track member of said second track comprises a longitudinal channel, and said second attaching means comprises a splice bar disposed in said channel and at least one bolt for rotatingly engaging a threaded aperture in said splice bar.

38. The conveyor system of claim 30 wherein said first track and said second track each have at least one said track member having the same cross section.

39. The conveyor system of claim 30 wherein said track members of said first track and said track members of said second track have different cross sections.

40. The conveyor system of claim 23, further comprising a third track which is connected to said second track by means of a Z-shaped connector.

41. The conveyor of claim 23, further comprising a third track which is connected to at least one of said yokes by means of a Z-shaped connector.

42. The system of claim 23 wherein said attachment means is disposed on said back side between said first and second sides.

\* \* \* \* \*